United States Patent
Kim

(10) Patent No.: US 12,106,209 B1
(45) Date of Patent: Oct. 1, 2024

(54) METHOD FOR EVALUATING AN ARTIFICIAL NEURAL NETWORK MODEL PERFORMANCE AND SYSTEM USING THE SAME

(71) Applicant: DEEPX CO., LTD., Seongnam si (KR)

(72) Inventor: Lok Won Kim, Yongin-si (KR)

(73) Assignee: DEEPX CO., LTD., Seongnam si (KR)

( * ) Notice: Subject to any disclaimer, the term of this patent is extended or adjusted under 35 U.S.C. 154(b) by 0 days.

(21) Appl. No.: 18/401,718

(22) Filed: Jan. 2, 2024

(30) Foreign Application Priority Data

Jul. 4, 2023 (KR) .................. 10-2023-0086192
Nov. 30, 2023 (KR) .................. 10-2023-0170668

(51) Int. Cl.
*G06N 3/063* (2023.01)
*G06N 3/082* (2023.01)

(52) U.S. Cl.
CPC ............. *G06N 3/063* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 2018/0189645 A1* | 7/2018 | Chen | G06N 3/049 |
| 2019/0114534 A1* | 4/2019 | Teng | G06N 3/04 |
| 2020/0034710 A1* | 1/2020 | Sidhu | G06N 3/08 |
| 2020/0134417 A1* | 4/2020 | Mohapatra | G06F 15/80 |
| 2021/0150352 A1* | 5/2021 | Kim | G06F 3/061 |
| 2021/0271963 A1* | 9/2021 | Amisano | G06N 3/08 |
| 2022/0036155 A1* | 2/2022 | Guevara | G06N 3/044 |

* cited by examiner

*Primary Examiner* — Eric Nilsson
(74) *Attorney, Agent, or Firm* — WTA Patents

(57) ABSTRACT

A method for evaluating artificial neural network (ANN) model's processing performance comprising selecting a type and a number of at least one neural processing unit (NPU) for processing performance evaluation for a user, selecting at least one of a plurality of compilation options for an artificial neural network (ANN) model to be processed by the at least one NPU which is selected, uploading the ANN model and at least one evaluation dataset to be processed by the at least one NPU which is selected, compiling the ANN model according to the at least one of the plurality of compilation options which is selected, and reporting a processing performance by processing the ANN model on the at least one NPU which is selected.

28 Claims, 11 Drawing Sheets

114

Display Device

Selection 1 (DX-M1)
Performance Result:
Time: 45sec
Accuracy score: 5
Power consumption: 5
.
.
.

Selection 2 (DX-H1)
Performance Result:
Time: 30sec
Accuracy score: 5
Power consumption: 8
.
.
.

Recommendation: Selection 1

METHOD FOR EVALUATING AN ARTIFICIAL NEURAL NETWORK MODEL PERFORMANCE AND SYSTEM USING THE SAME

CROSS-REFERENCE TO RELATED APPLICATIONS

This application claims priority to Republic of Korea Patent Application No. 10-2023-0086192 filed on Jul. 4, 2023, and Republic of Korea Patent Application No. 10-2023-0170668 filed on Nov. 30, 2023, in the Korean Intellectual Property Office, the disclosures of which are incorporated herein by reference.

BACKGROUND OF THE DISCLOSURE

Technical Field

The present disclosure relates to an artificial neural network model performance evaluation method, and a system using the method.

Background Art

Humans possess intelligence to recognize, classify, infer, predict, and make decisions. Artificial intelligence (AI) seeks to emulate this kind of human cognitive ability. The human brain is an intricate network of numerous nerve cells, known as neurons. Each of these neurons forms hundreds or even thousands of connections with other neurons via synapses. To replicate human intelligence, the concept of an artificial neural network (ANN) has been developed. This involves modeling the functional principles of biological neurons and their interconnections using nodes connected in a layer structure.

SUMMARY OF THE DISCLOSURE

Embodiments relate to an artificial neural network (ANN) system. The ANN system includes a plurality of neural processors, memory and one or more operating processors. The neural processors include a first neural processor of a first configuration and a second neural processor of a second configuration different from the first configuration. The one or more operating processors receive an ANN model, first selection of one or more neural processors including at least one of the first neural processor or the second neural processor for instantiating the ANN model, and compilation options. The one or more operating processors instantiate at least one layer of the ANN model on the first one or more selected neural processors by compiling the ANN model according to the compilation options. The one or more operating processors perform processing on one or more evaluation datasets by the first one or more selected neural processors instantiating the at least one layer of the ANN model, and generate one or more first performance parameters associated with processing of the one or more evaluation datasets by the first one or more selected neural processors instantiating at least one layer of the ANN model.

In one or more embodiments, the ANN system further includes a computing device. The computing device includes one or more processors, and memory storing instruction thereon. The instructions cause the one or more processors to receive the first selection of the one or more neural processors, the one or more evaluation datasets, and the compilation options from a user device via a network. The one or more processors send the first selection of the one or more neural processors, the one or more evaluation datasets, and the compilation options to the one or more operating processors. The one or more processors receive the one or more first performance parameters from the one or more operating processors, and send the received one or more first performance parameters to the user device via the network.

In one or more embodiments, the instructions cause the one or more processors to protect the one or more evaluation datasets by at least one of data encryption, differential privacy, and data masking.

In one or more embodiments, the compilation options include selection on using at least one of a quantization algorithm, a pruning algorithm, a retraining algorithm, a model compression algorithm, an artificial intelligence (AI) based model optimization algorithm, or a knowledge distillation algorithm to improve performance of the ANN model.

In one or more embodiments, at least the first neural processor includes internal memory and a multiply-accumulator, and wherein the instructions further cause the one or more operating processors to automatically set the at least one of the compilation options based on the first configuration.

In one or more embodiments, the instructions further cause the one or more processors to determine whether at least another of layers in the ANN model is operable using the first one or more selected neural processors.

In one or more embodiments, the instructions further cause the one or more processors to generate an error report responsive to determining that at least the other of the layers in the ANN model is inoperable using the first one or more selected neural processors.

In one or more embodiments, the ANN system further includes a graphics processor to process the at least other of the layers in the ANN model that is determined to be inoperable using the one or more selected neural processors.

In one or more embodiments, the graphics processor further performs retraining of the ANN model for instantiation on the first one or more selected neural processors.

In one or more embodiments, the one or more first performance parameters include at least one of temperature profile, power consumption, a number of operations per second per watt, frame per second (FPS), inference per second (IPS), and accuracy of inference or prediction, of the first one or more selected neural processors.

In one or more embodiments, the one or more operating processors receive second selection of one or more neural processors including at least one of the first neural processor or the second neural processor for instantiating the ANN model. The one or more operating processors instantiate the at least one layer of the ANN model on the second one or more selected neural processors by compiling the ANN model; perform processing on the one or more evaluation datasets by the second one or more selected neural processors instantiating the at least one layer of the ANN model, and generate one or more second performance parameters associated with processing of the one or more evaluation datasets by the second one or more selected neural processors instantiating the at least one layer of the ANN model.

In one or more embodiments, the one or more operating processors generate recommendation on the first selection of one or more neural processors or the second selection of one or more neural processors by comparing the one or more first performance parameters and the one or more second performance parameters, and send the recommendation to a user terminal.

In one or more embodiments, the received compilation options represent one of a plurality of preset options representing combinations of applying of (i) a post training quantization (PTQ), (ii) a layer-wise retraining of the ANN model, and (iii) a quantization aware retraining (QAT).

Embodiments also relate to displaying options for selecting one or more neural processors including a first neural processor of a first configuration and a second neural processor of a second configuration different from the first configuration. A first selection of the one or more neural processors for instantiating at least one layer of an artificial neural network (ANN) model is received from a user. Compilation options are associated with compilation of the ANN model for instantiation the at least one layer. First selection of the compilation options is received from a user. The first selection, the selected compilation options, and one or more evaluation datasets are sent to a computing device coupled to the one or more neural processors. One or more first performance parameters associated with processing of the one or more evaluation datasets by the first selection of one or more neural processors instantiating at least one layer of the ANN model using the first selected compilation options are received. The one or more first performance parameters are displayed.

In one or more embodiments, second selection of the one or more neural processors and second selection of the compilation options are received from the user. The second selection of the one or more neural processors and the selected compilation options are sent to the computing device coupled to the one or more neural processors. One or more second performance parameters associated with processing of the one or more evaluation datasets by the second selection of one or more neural processors instantiating at least one layer of the ANN model using the second selected compilation options are displayed.

In one or more embodiments, recommendations on use of the first selection of the one or more neural processors or the second selection of the one or more neural processors are received and displayed.

DETAILED DESCRIPTION OF THE EMBODIMENT

Figure 1:
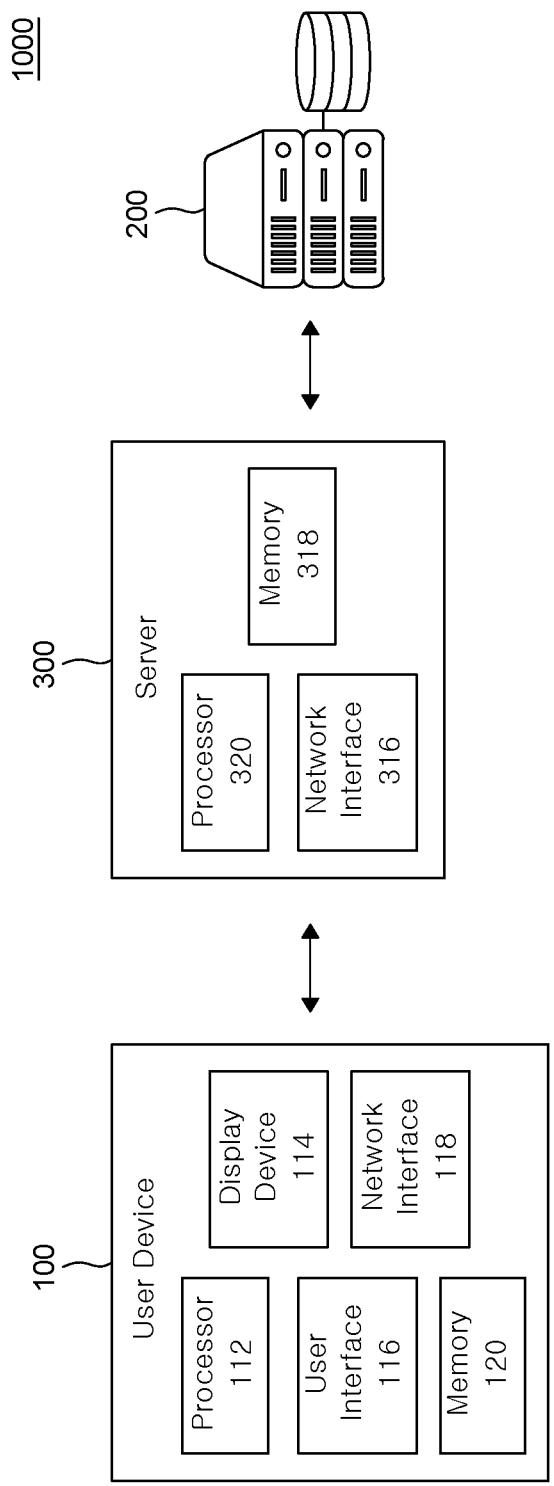
FIG. 1 is a block diagram illustrating an artificial neural network model performance evaluation system, according to an example of the present disclosure.

The advantages and features of the present disclosure will become apparent upon reference to the examples described in detail in the accompanying drawings. However, the disclosure is not limited to the examples disclosed herein and may be embodied in many different forms, and the examples are provided merely to make the disclosure complete and to fully inform one of ordinary skill in the art to which the disclosure belongs of the scope of the invention. With respect to the description in the drawings, similar reference numerals may be used for similar elements.

In the present disclosure, expressions such as "has," "may have," "includes," or "may comprise" refer to the presence of a feature (e.g., a numerical value, function, behavior, or component such as a part) and do not exclude the presence of additional features.

In this present disclosure, expressions such as "A or B," "at least one of A or/and B" or "one or more of A or/and B" may include all possible combinations thereof. For example, "A or B," "at least one of A and B" or "at least one of A or B" may refer to both (1) including at least one A, (2) including at least one B, or (3) including both at least one A and at least one B.

As used herein, expressions such as "first," "second," "first or second" may modify various elements, regardless of order and/or importance. Said expressions are used only to distinguish one element from other elements, and do not limit the elements. For example, the first user apparatus and the second user device may represent a different user device regardless of order or importance. For example, without departing from the scope of rights described in this disclosure, the first element may be named as the second element, and similarly, the second element may also be renamed as the first element.

When an element (e.g., a first element) is referred to as being "operatively or communicatively coupled with/to" or "connected to" another element (e.g., a second element), it is to be understood that said element may be directly connected to said other element, or may be connected through another element (e.g., a third element). On the other hand, when an element (e.g., a first element) is referred to as being "directly connected" or "directly connected" to another element (e.g., a second element), it is to be understood that there is no other element (e.g., a third element) between said element and said other element.

As used in the present disclosure, the expression "configured to" may be used interchangeably with, for example, "suitable for," "having the capacity to," "designed to," "adapted to," "made to," or "capable of," depending on the context. The term "configured (or made for)" may not necessarily mean "specifically designed to" hardware.

Instead, in some situations, the phrase "a device configured to do" may mean that the device "can" do something in conjunction with other devices or elements. For example, the phrase "a processor configured (or set) to perform A, B, and C" can mean a processor dedicated to performing those actions (e.g., an embedded processor), or a generic-purpose processor (e.g., a CPU or application processor) that can perform those actions by executing one or more software programs stored on a memory device.

Terms used in present disclosure are only used to describe specific examples, and may not be intended to limit the scope of other examples. The singular expression may include the plural expression unless the context clearly dictates otherwise. Terms used herein, including technical or scientific terms, may have the same meanings as commonly understood by one of ordinary skill in the art described in this document. Among terms used in present disclosure, terms defined in a general dictionary may be interpreted as having the same or similar meaning as the meaning in the context of the related art. Unless explicitly defined in this document, it should not be construed in an ideal or overly formal sense. In some cases, even terms defined in the present disclosure cannot be construed to exclude examples of the present disclosure. The terms used herein are used only to describe specific examples, and are not intended to limit the present disclosure.

Each feature of the various examples of the present disclosure may be partially or wholly combined or combined with each other. Various examples of the present disclosure are technically capable of various interlocking and driving as can be fully understood by those skilled in the art. Each of the examples of the present disclosure may be implemented independently of each other or may be implemented together in an association relationship.

The present disclosure is directed to, among others, addressing issues in commercialization and deployment of neural processing units (NPUs, also referred to herein as "neural processors") for processing artificial neural network (ANN) models. First, there is a lack of information for selecting the appropriate processor to process a user-developed artificial neural network model. Second, the commercialization of NPUs is in its infancy, and reviewing of various questionnaires and data sheets and technical support from engineers are involved in determining whether a GPU-based artificial neural network model will work on a specific NPU. In particular, the number of layers, the size of parameters, and special functions of the ANN models are different, and hence, there is no guarantee that certain ANN models may be instantiated using the specific NPU. Third, it is difficult to know in advance whether a user-developed artificial neural network model will run on a particular NPU. In other words, a purchased NPU may turn out to not support certain types of computations or operations for executing a user-developed ANN model. Fourth, it is difficult to know in advance how a user-developed neural network model would perform in terms of performance (e.g., power consumption and frame per second (FPS)) when it is executed on a specific NPU. In particular, due to the difference in the size of the weights, the size of the feature map, the number of layers, and the characteristics of the activation function, it is difficult to know the desired performance in advance.

The present disclosure facilitates selection and deployment of NPU products by allowing users to test NPU products before purchasing, and providing recommendation on an appropriate selection of NPU products. Specifically, embodiments enable the users to perform a series of operations in batches online by uploading artificial intelligence (AI) models (embodied, e.g., by using TensorFlow™, Py Torch™, ONNX™ model file) and their evaluation datasets code to an online simulation service. The ANN models may be compiled and then instantiated on the selected NPU products, and executed on evaluation datasets to determine the compatibility of the ANN models with the NPU products and also assess their performance.

FIG. 1 is a block diagram of an ANN model performance evaluation system 1000, according to an example of the present disclosure. The ANN performance evaluation system 1000 may include, among other components, a user device 100, an ANN model processing device 200, and a server 300 between the user device 100 and the ANN model processing device 200. The ANN model performance evaluation system 1000 of FIG. 1 may process a particular ANN model on the ANN model processing device 200 and provide processing performance evaluation results of the ANN model processing device 200 to a user via the user device 100.

The user device 100 may be a device used by a user to obtain processing performance evaluation result information of an ANN model processed on the ANN model processing device 200. The user device 100 may include a smartphone, tablet PC, PC, laptop, or the like that can be connected to the server 300 and may provide a user interface for viewing information related to the ANN model. The user device 100 may access the server 300, for example, via a web service, an FTP server, a cloud server, or an application software executable on the user device 100. These are merely examples, and various other known communication technologies or technologies to be developed may be used instead to connect to the server 300. The user may utilize various communication technologies to transmit the ANN model to the server 300. Specifically, the user may upload an ANN model and a particular evaluation dataset to the server 300 via the user device 100 for evaluating the processing performance of a NPU that is a candidate for the user's purchase.

The evaluation dataset refers to an input for feeding to the ANN model processing device 200 for performing performance evaluation by the ANN model processing device 200.

The user device 100 may receive from the ANN model processing device 200 a performance evaluation result of the ANN model processing device 200 for the ANN model, and may display the result. The user device 100 may be any type of computing device that may perform one or more of the following: (i) uploading the ANN model to be evaluated by the ANN model performance evaluation system 1000 to the server 300, (ii) uploading an evaluation dataset for evaluating an ANN model to the ANN model performance evaluation system 1000, and (iii) uploading a training dataset for retraining the ANN model to the ANN model performance evaluation system 1000. In other words, the user device 100 may function as a data transmitter for evaluating the performance of the ANN model and/or a receiver for receiving and displaying the performance evaluation result of the ANN model.

For this purpose, the user device 100 may include, among other components, a processor 112, a display device 114, a user interface 116, a network interface 118 and memory 120. The display device 114 may present options for selecting one or more NPUs for instantiating the ANN model, and also present options for compiling the ANN model, as described below in detail with reference to FIGS. 5A and 5B. Memory 120 may store software modules (e.g., web browser) executable by processor 112 to access server 300, and also store ANN model and performance evaluation data set for sending to the ANN model processing device 200 via the server 300. The user interface 116 may include keyboard and mouse, and enables the user to provide user inputs associated with, among others, making selections on the one or more NPUs for instantiating the ANN model and compilation options associated with compiling of the ANN model. The network interface 118 is a hardware component (e.g., network interface card) that enables the user device 100 to communicate with the server 300 via a network.

The ANN model processing device 200 includes NPU farm 218 for instantiating ANN models received the user device 100 via the server 300. The ANN model processing device 200 may also compile the ANN models for instantiation on one or more NPUs in the NPU farm 218, assess the performance of the instantiated ANN models, and report the performance result to the user device 100 via the server 300, as described below in detail with reference to FIG. 2.

The server 300 is a computing device that communicates with the user device 100 to manage access to the ANN model processing device 200 for testing and evaluating one or more NPUs in the NPU farm 218. The server 300 may include, among other components, a processor 312, a network interface 316, and memory 318. The network interface 316 enables the server 300 to communicate with the user device 100 and the ANN model processing device 200 via networks. Memory 318 stores instructions executable by processor 312 to perform one or more of the following operations: (i) manage accounts for a user, (ii) authenticate and permit the user to access the ANN model processing device 100 to evaluate the one or more NPUs, (iii) receive the ANN model, evaluation datasets, the user's selection on NPUs to be evaluated, and the user's selection on compilation choices, (iv) encrypt and store data received from the user, (v) send the ANN model and user's selection information to the ANN model processing device 100 via a network, and (vi) forward a performance report on the selected NPUs and recommendation on the NPUs to the user device 100 via a network. The server 300 may perform various other services such as providing a marketplace to purchase NPUs that were evaluated by the user.

To enhance the security of the data (e.g., the user-developed ANN model, the training dataset, the evaluation dataset) received from the user, the server 300 may enable users to securely login to their account, and perform data encryption, differential privacy, and data masking.

Data encryption protects the confidentiality of data by encrypting user data. Differential privacy uses statistical techniques to desensitize user data to remove personal information. Data masking protects user data by masking parts of it to hide sensitive information.

In addition, access control by the server 300 limits which accounts can access user data, audit logging records on accounts that have accessed user data, and maintains logs of system and user data access to track who accessed the model and when, and to detect unusual activity. In addition, the uploading of training datasets and/or evaluation datasets may further involve signing a separate user data protection agreement to provide legal protection for the user's ANN model, training dataset, and/or evaluation dataset.

Figure 2:
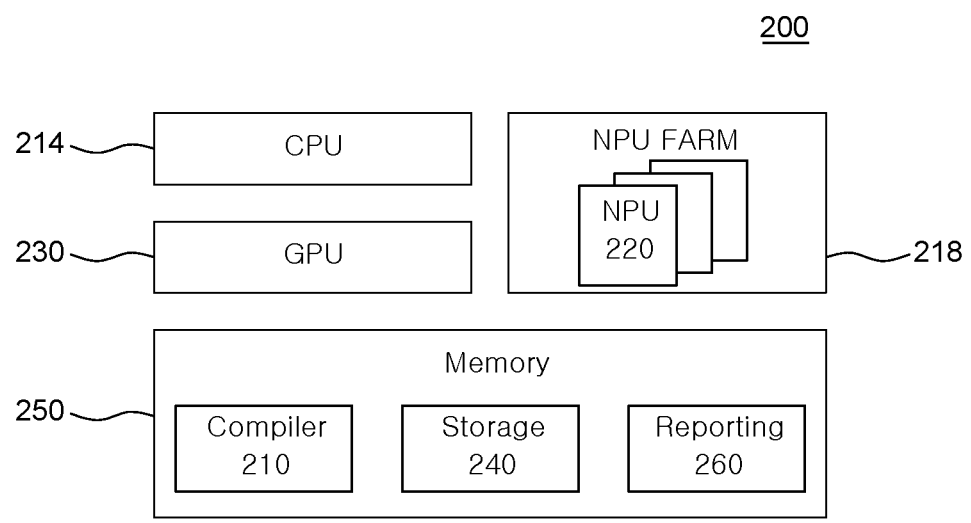
FIG. 2 is a block diagram illustrating an artificial neural network model processing apparatus, according to an example of the present disclosure.

FIG. 2 is a block diagram of the ANN model processing device 200, according to an example of the present disclosure. The ANN model processing device 200 may include, among other components, a central processing unit (CPU) 214, an NPU farm 218 (including a plurality of NPUs 220), a graphics processing unit (GPU) 230, and memory 250. These components may communicate with each other via one or more communication buses or signal lines (not shown).

The CPU 214 may include one or more operating processors for executing instructions stored in memory 250. Memory 250 may store various software modules including, but not limited to, compiler 210, storage module 240, and reporting program 260. Memory 250 can include a volatile or non-volatile recording medium that can store various data, instructions, and information. For example, memory 250 may include a storage medium of at least one of the following types: flash memory type, hard disk type, multimedia card micro type, card type memory (e.g., SD or XD memory), RAM, SRAM, ROM, EEPROM, PROM, network storage, cloud, and blockchain database.

The compiler 210 may translate a particular ANN model into machine code or instructions that can be executed by a plurality of NPUs 220. In doing so, the compiler 210 may take into account different configurations and characteristics of NPUs 220 selected for instantiating and executing the ANN model. Because each type of NPUs may have different number of processing elements (or cores), different internal memory size, and channel bandwidths, the compiler 210 generates the machine code or instructions that are compatible with the one or more NPUs 220 selected for instantiating and executing the ANN model. For this purpose, the compiler 210 may store configurations or capabilities of each type of NPUs available for evaluation and testing.

The compiler 210 may perform compilation based on various compilation options as selected by the user. The compilation options may be provided as user interface (UI) elements on a screen of the user device 100, as described below in detail with reference to FIGS. 5A and 5B. The compiler 210 may set the plurality of compilation options differently for each NPU selected for performance evaluation to generate compatible machine code or instructions. The plurality of compilation options may vary for different types of NPUs 220, so that even for the same ANN model, the compiled machine code or instructions may vary for different types of NPUs 220 of different configurations.

The storage module 240 may store various data used by the ANN model processing device 200. That is, the storage module 240 may store ANN models compiled into the form of machine code or instructions for configuring selected NPUs 220, one or more training datasets, one or more evaluation dataset, performance evaluation results and output data from the plurality of neural processing units 220.

The reporting program 260 may determine whether the compiled ANN model is operable by the plurality of NPUs 220. If the compiled ANN model is inoperable by the plurality of NPUs 220, the reporting program 260 may report that one or more layers of the ANN model are inoperable by the selected NPUs 220, or that a particular operation associated with the ANN model is inoperable. If the compiled ANN model is executable by a particular NPU, the reporting program 260 may report the processing performance of that particular NPU.

The performance may be indicated by performance parameters such as a temperature profile, power consumption (Watt), trillion operations per second per watt (TOPS/W), frames per second (FPS), inference per second (IPS), and inference accuracy. Temperature profile refers to the temperature change data of a NPU measured over time when the NPU is operating. Power consumption refers to power data measured when the NPU is operating. Because power consumption depends on the computational load of the user-developed ANN model, the user's ANN model may be provided and deployed for accurate power measurement. Trillion operations per second per watt (TOPS/W) is a metric that measures the efficiency of AI accelerator, meaning the number of operations that can be performed for one second per watt. TOPS/W is an indicator of the energy efficiency of the plurality of NPUs 220, as it represents how many operations the hardware can perform per unit of power consumed. Inference Per Second (IPS) is an indicator of the number of inference operations that the plurality of NPUs 220 can perform in one second, thus indicating the computational processing speed of the plurality of NPUs 220. IPS may also be referred to as frame per second (FPS). Accuracy refers to the inference accuracy of the plurality of NPUs 220, as an indicator of the percentage of samples correctly predicted out of the total. As further explained, the accuracy of the plurality of NPUs 220 and the inference accuracy of the GPU 230 may differ. This is because the parameters of the ANN model inferred by the GPU 230 may be in a form of floating points, while the parameters of the ANN model inferred by the plurality of NPUs 220 may be in a form of integers. Further, various optimization algorithms may be optionally applied. Thus, the parameters of the ANN models inferred by the plurality of NPUs 220 may have differences in values calculated by various operations, and thus may have different inference accuracies from the ANN models inferred by the GPU 230. The difference in inference accuracy may depend on the structure and parameter size characteristics of the ANN model, and in particular, the shorter the length of the bitwidth of the quantized parameter, the greater the degradation in inference accuracy due to excessive quantization. For example, the quantized bitwidth can be from 2-bit to 16-bit. The degradation of inference accuracy due to excessive pruning also tends to be larger.

The reporting program 260 may analyze the processing performance of the ANN model compiled according to each of the compilation options, and recommend one of the plurality of compilation options. The reporting program 260 may also recommend a certain type of NPU for instantiating the ANN model based on the performance parameters of different NPUs. Different types or combinations of NPUs may be evaluated using the evaluation dataset to determine performance parameters associated with each type of NPU or combinations of NPUs. Based on the comparison of the performance parameters, the reporting program 260 may recommend the type of NPU or combinations of NPUs suitable for instantiating the ANN model.

Memory 250 may also store software components not illustrated in FIG. 2. For example, memory 250 may store instructions that combine outputs from multiple selected NPUs. When multiple NPUs are selected to generate their own outputs that are subsequently combined or processed to generate an output of a corresponding ANN model, the combining or the processing of the outputs from the NPUs may be performed by the CPU 214. Alternatively, such operations may be performed by GPU 230 or one of the selected NPUs.

The NPU farm 218 may include various families of NPUs of different performance and price points sold by a particular company. The NPU farm 218 may be accessible online via the server 300 to perform performance evaluation of user-developed ANN models. The NPU farm 218 may be provided in the form of cloud NPUs. The plurality of NPUs 220 may receive an evaluation dataset as an input and receive a compiled ANN model for instantiation and performance evaluation. The plurality of NPUs 220 may include various types of NPUs. In one or more embodiments, the NPUs 220 may include different types of NPUs available from a manufacture.

More specifically, the plurality of NPUs 220 may be categorized based on processing power. For example, a first NPU may be a NPU for a smart CCTV. The first NPU may have the characteristics of ultra-low power, low-level inference processing power (e.g., 5 TOPS of processing power), very small semiconductor package size, and very low price. Due to performance limitations, the first NPU may not support certain ANN models that include certain operations and require high memory bandwidth. For example, the first NPU may have a model name "DX-V1" and may compute ANN models such as ResNet, Mobilenet v1/v2, SSD, YOLOv5, YOLOv7, and the like. On the other hand, the second NPU may be a NPU for image recognition, object detection, and object tracking of a robot. The second NPU may have the characteristics of low power, moderate inference processing power (e.g., 16 TOPS of processing power), small semiconductor package size, and low price. The second NPU may not support certain ANN models that require high memory bandwidth. For example, the second NPU may have a model name "DX-V2" and may compute ANN models such as ResNet, Mobilenet v1/v2, SSD, YOLOv5, YOLOv7, and the like. The third NPU may be a NPU for image recognition, object detection, object tracking, and generative AI services for autonomous vehicles. The third NPU may have low power, high level inference processing power (e.g., 25 TOPS of processing power), medium semiconductor package size, and medium price. For example, the third NPU may have a model name "DX-M1" that may compute ANN models such as ResNet, MobileNet v1/v2/v3, SSD, EfficientNet, EfficientDet, YOLOv5, YOLOv7, YOLOv8, DeepLabv3, PIDNet, ViT, Generative adversarial network, Stable diffusion, and the like. The fourth NPU may be a NPU for CCTV control rooms, control centers, large language models, and generative AI services. The fourth NPU may have low power, high level inference processing power (e.g., 400 TOPS of processing power), large semiconductor package size, and high price characteristics. For example, the fourth NPU may have a model name "DX-H1", and may compute ANN models such as ResNet, Mobilenet v1/v2, SSD, YOLOv5, YOLOv7, YOLOv8, DeepLabv3, PIDNet, ViT, Generative adversarial network, Stable diffusion, and large LLM. In other words, each NPU can have different computational processing power, different semiconductor chip die sizes, different power consumption characteristics, and the like. However, the types of the plurality of NPUs 220 are not limited thereto and may be categorized by various classification criteria.

The GPU 230 is hardware that performs complex computational tasks in parallel. The GPUs are widely used in graphics and image processing but have expanded their uses to processing various machine learning operations. Although GPU 230 is illustrated as a single device, it may be embodied as a plurality of graphics processing units connected by a cloud GPU, NVLink, NVSwitch, or the like. The GPU 230 includes a plurality of cores that process multiple tasks in parallel. Thus, the GPU 230 can perform large-scale data processing tasks such as scientific computation and deep learning.

Specifically, the GPU 230 may be used to train deep learning and machine learning models on large datasets. Deep learning models have a large number of parameters, making training time-consuming. The GPU 230 can perform operations in parallel to generate or update the parameters, and thereby speed up training. When a user selects a particular NPU from the plurality of NPUs 220 and performs retraining of the ANN model through various compilation options, the GPU 230 may be used to retrain of the ANN model according to each compilation option. Furthermore, when a layer of the ANN model is not compatible for instantiating on an NPU, the GPU 230 may be used instead to instantiate the layer and perform processing of the instantiated layer.

In one or more embodiments, a plurality of NPUs 220 and one or more GPUs 230 may be implemented in the form of an integrated chip (IC), such as a system on chip (SoC) that incorporates various computing devices, or a printed circuit board on which the integrated chip is mounted.

Figure 3:
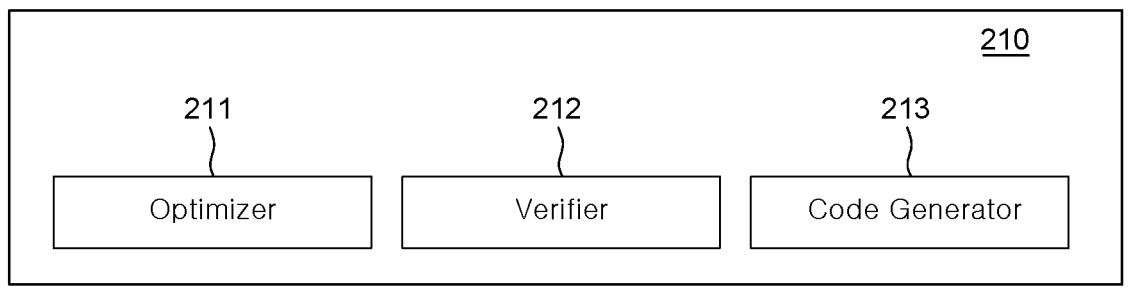
FIG. 3 is a block diagram illustrating a compiler of an artificial neural network model processing apparatus, according to an example of the present disclosure.

FIG. 3 is a block diagram illustrating the compiler 210 of the ANN model processing device 200, according to an example of the present disclosure. The compiler 210 may compile an ANN model into machine code or instructions based on a plurality of compilation options. The compiler 210 may be provided with hardware data of a NPU selected from the plurality of NPUs 220. The hardware data of the NPU may include the size of the NPU internal memory, a hierarchical structure of the NPU internal memory, information about the number of processing elements (or cores), information about special function units, and the like. The compiler 210 may determine a processing order for each layer based on the hardware data of the NPU and the graph information of the ANN model to be compiled. The machine code or the instructions may be fed to one or more selected NPUs 220 to configure them to instantiate the ANN model. The compiler 210 may include, among other components, an optimization module 211, a verification module 212, and a code generator module 213.

The optimization module 211 may perform the task of modifying the ANN model represented by a directed acyclic graph (DAG) to increase one or more of efficiency, accuracy and speed. The user may select at least one of various optimization options provided by the optimization module 211 online via the user device 100. For example, the optimization module 211 may provide an option to convert to parameters of a particular bitwidth to parameters of another bitwidth. The specific bitwidth may be between 2-bit and 16-bit. For example, the optimization module 211 may convert the ANN model based on floating point parameters to an ANN model based on integer parameters when the one or more selected NPUs 220 are designed to process integer parameters. The optimization module 211 may also convert an ANN model based on nonlinear trigonometric operations to an ANN model based on piecewise linear function approximation when the one or more selected NPUs 220 are designed to process the piecewise linear function approximation operations. The optimization module 211 may also apply various optimization algorithms to reduce the size of parameters such as weights, feature maps, and the like of the ANN model. For example, the optimization module 211 can improve the accuracy degradation problem of an optimized neural network model by using various retraining algorithms.

The verification module 212 may perform validation to determine whether the user's ANN model is operable on the one or more selected NPUs 220. The verification module 212 determines whether the ANN model is executable by analyzing the structure of the modified ANN model and determining whether the operations at each layer are supported by the hardware of the one or more selected NPUs 220. If the operations are not executable, a separate error report file can be generated and reported to the user.

The code generator module 213 may generate machine code or instructions for instantiating and executing the ANN model, as modified by the optimization module 211, on each of the selected NPUs 220. In one embodiment, such generation of machine code or instructions may be performed only on the ANN models determined to be operable on the one or more selected NPUs 220 by the verification module 212. The generated machine code can be provided to program one or more selected NPUs 220 to instantiate the modified ANN model. For example, first through fourth machine code or instruction set corresponding to the modified ANN model may be generated and fed to the first through fourth NPUs, respectively.

Figure 4:
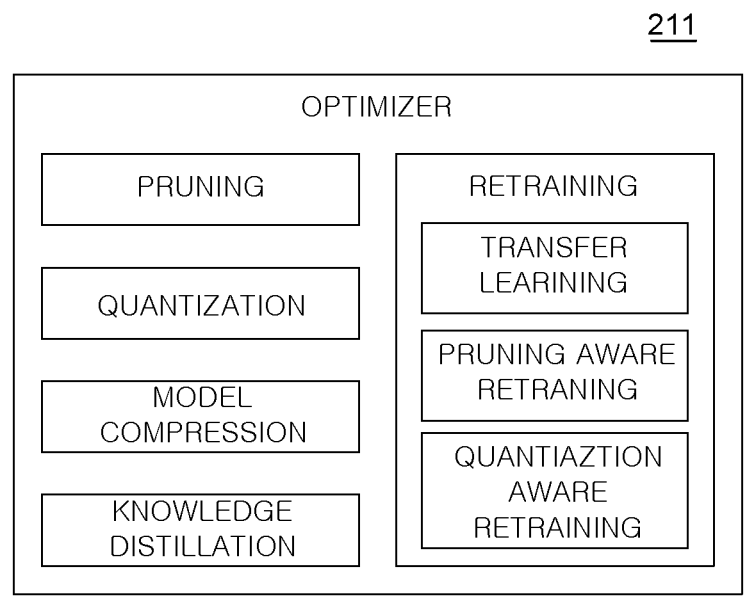
FIG. 4 is a block diagram illustrating an optimization module of an artificial neural network model processing apparatus, according to an example of the present disclosure.

FIG. 4 is a block diagram illustrating the optimization module 211, according to an example of the present disclosure. The optimization module 211 can modify the ANN model based on a plurality of compilation options to enhance the ANN model in terms of at least one of the efficiency, speed and accuracy. The compilation options may be set based on hardware information of the NPU 220 being used to instantiate the ANN model. In addition or alternatively, the optimization module 211 may automatically set the plurality of compilation options taking into account characteristics or parameters of the ANN model (e.g., size of weights and size of feature maps) and characteristics of inference accuracy degradation. The plurality of compilation options set using the optimization module 211 may be at least one of a quantization option, a pruning option, a retraining option, a model compression option, an AI based model optimization option, and a knowledge distillation option.

Activation of the pruning option may provide techniques for reducing the computation of an ANN model. The pruning algorithm may replace small, near-zero values with zeros in the weights of all layers of the ANN model, and thereby sparsify the weights. The plurality of NPUs 220 can skip multiplication operations associated with zero weights to speed up the computation of convolutions, reduce power consumption, and reduce the parameter size in the machine code of the ANN model with the pruning option. Zeroing out a particular weight parameter by pruning is equivalent to disconnecting neurons corresponding to that weight data in a neural network. The pruning options may include a value-based first pruning option that removes smaller weights or a percentage-based second pruning option that removes a certain percentage of the smallest weights.

Activation of the quantization option may provide a technique for reducing the size of the parameters of the ANN model. The quantization algorithm may selectively reduce the number of bits in the weights and the feature maps of each layer of the ANN model. When the quantization option reduces the number of bits in a particular feature map and particular weights, it can reduce the overall parameter size of the machine code of the ANN model. For example, a 32-bit parameter of a floating point can be converted to a parameter of 2-bit through 16-bit integer when the quantization option is active.

Activation of the model compression option applies techniques for compressing the weight parameters, feature map parameters, and the like of an ANN model. The model compression technique can be implemented by utilizing known compression techniques in the art. This can reduce the parameter size of the machine code of an ANN model with the model compression option. The model compression option may be provided to a NPU including a decompression decoder.

Activation of the knowledge distillation option applies a technique for transferring knowledge gained from a complex model (also known as a teacher model) to a smaller, simpler model (also known as a student model). In a knowledge distillation algorithm, the teacher model typically has larger parameter sizes and higher accuracy than the student model. For example, in the retraining option described later, the accuracy of the student model can be improved with a knowledge distillation option in which an ANN model trained with floating point 32-bit parameters may be set as the teacher model and an ANN model with various optimization options may be set as the student training model. The student model may be a model with at least one of the following options selected: pruning option, quantization option, model compression option, and retraining option.

Activation of the retraining option applies a technique that can compensate for degraded inference accuracy when applying various optimization options. For example, when applying a quantization option, a pruning option, or a model compression option, the accuracy of an ANN model inferred by the plurality of NPUs 220 may decrease. In such cases, an option may be provided to retrain the pruned, quantized, and/or model-compressed neural network model online to recover the accuracy of the inference. Specifically, the retraining option may include a quantization aware retraining option, a pruning aware retraining option, and a transfer learning option.

Activation of the quantization-aware retraining (QAT) option incorporates quantization into the retraining phase of the neural network model, where the model fine-tunes the weights to reflect quantization errors. The quantization-aware retraining algorithm can include the loss function, gradient calculation, and optimization algorithm modifications. The quantization-aware retraining option can compensate for quantization errors by quantizing the trained neural network model and then performing fine-tuning to retrain it in a way that minimizes the loss due to quantization.

Activation of the pruning-aware retraining (PAT) option identifies and removes less important weights from the trained neural network model and then fine-tunes the active weights. Pruning criteria can include weight value, activation values, and sensitivity analysis. The pruning-aware retraining option may reduce the size of the neural network model, increase inference speed, and compensate overfitting problem during retraining.

Activation of the transfer learning option allows an ANN model to learn by transferring knowledge from one task to another related task. Transfer learning algorithms are effective when there is not enough data to begin with, or when training a neural network model from scratch that requires a lot of computational resources.

Without limitation, the optimization module 211 can apply an artificial intelligence-based optimization to the ANN model. An artificial intelligence-based optimization algorithm may be a method of generating a reduced size of the ANN model by applying various algorithms from the compilation options. This includes exploring the structure of the ANN model using an AI-based reinforcement learning method or a method that is not based on a reduction method such as a quantization algorithm, a pruning algorithm, a retraining algorithm, a model compression algorithm, and a model compression algorithm, but rather a method in which an artificial intelligence integrated in the optimization module 211 performs a reduction process by itself to obtain an improved reduction result.

Figure 5A:
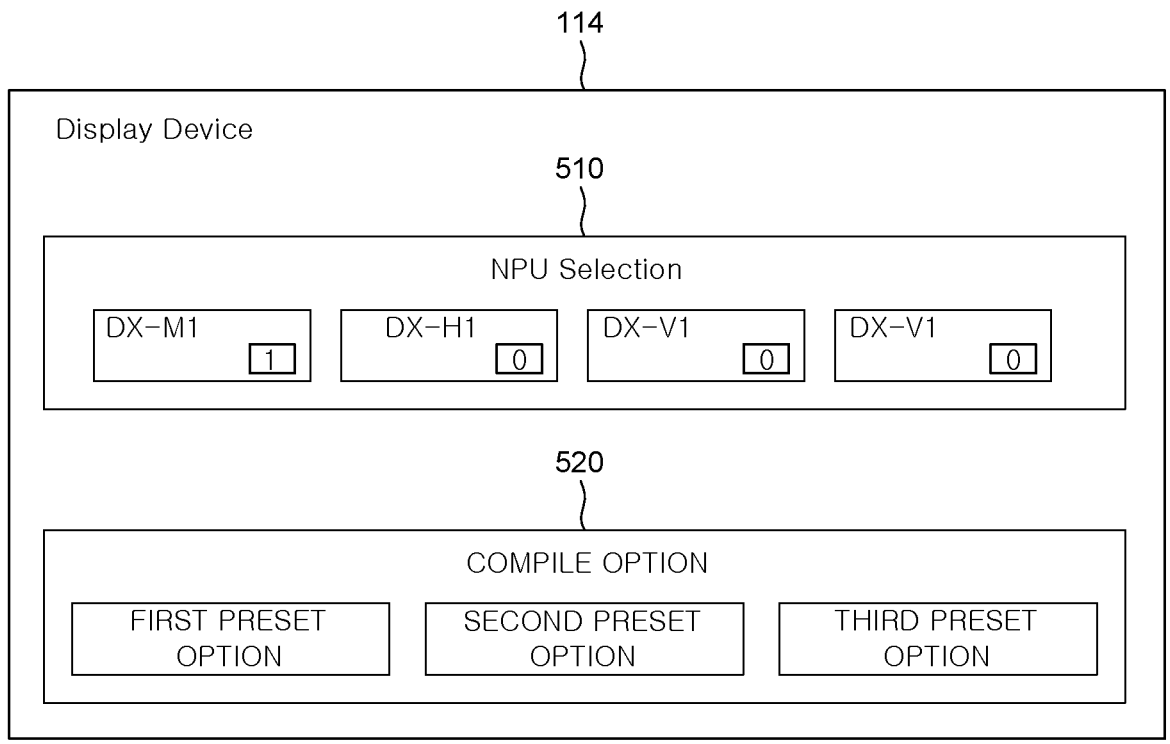
FIG. 5A is a user interface diagram for selecting one or more neural processors and selecting a compilation option, according to an example of the present disclosure.

FIG. 5A is a user interface diagram for selecting one or more neural processors and selecting a compilation option, according to an example of the present disclosure. The user interface may be presented on display device 114 of the user device 100 after the user accesses the server 300 using the user device 100.

The user interface diagram displays two sections, a NPU selection section 510 and a compile option section 520. The user may select one or more NPUs in the NPU selection section 510 to run simulation on the ANN model using one or more evaluation datasets. In the example, four types of NPUs are displayed for selection, DX-M1, DX-H1, DX-V1 and DX-V2. The user may identify the number of NPUs to be used in the online-simulation for evaluation the performance. In the example of FIG. 5A, one DX-M1 is selected for testing and evaluation. By providing non-zero numbers for multiple types of the NPUs in the NPU selection section 510, a combination of different types of NPUs may be used in the online-simulation and evaluation.

The compile option section 520 displays preset options to facilitate the user's selection of the compile choices. In the example of FIG. 5A, the compile option section 520 displays a first preset option, a second preset option, and a third preset option. In one embodiment, each of the preset options may be the most effective quantization preset option from a particular perspective. A user may select at least one preset option by considering the features of each preset option.

For example, the first preset option is an option that only performs a quantization algorithm to convert 32-bit floating point data of a trained ANN model to 8-bit integer data. In other examples, the converted bit data may be determined by the hardware configuration of the selected NPU. The first preset option may be referred to as post training quantization (PTQ) since the quantization algorithm is executed after training of the ANN model. The first preset option has the advantage of performing quantization quickly, typically completing within a few minutes. Therefore, it is advantageous to quickly check the results of the power consumption, computational processing speed, and the like of the ANN model provided by the user on the NPU selected by the user. A first preset option including a first quantization option may be provided to a user as an option called "DXNN Lite." The retraining of the ANN model may be omitted in the first preset option.

The second preset option may perform a quantization algorithm that converts 32-bit floating point data of the ANN model to 8-bit integer data, and then performs an algorithm for layer wise retraining of the ANN model. As in the first preset option, the converted bit data may depend on the hardware configuration of the selected NPU. Selecting the second preset option may cause performing of a layer-by-layer retraining algorithm using the ANN model that performed the first preset option as an input model. Thus, the second preset option may be a combination of the quantization algorithm and an algorithm from one of the various retraining options provided by the optimization module 211. In the second preset option, data corresponding to a portion of layers in the ANN model is quantized and its quantization loss function is calculated. Then, the data corresponding to another portion of the plurality of layers of the ANN model is quantized, and its quantization loss function is calculated. Such operations are repeated to enhance the quantization by reducing the quantization loss of some layers. The second preset option has the advantage that retraining can be performed in a manner that reduces the difference between the floating-point data (e.g., floating point 32) and the integer data (e.g., integer 8) in the feature map for each layer, and hence, retraining can be performed even if there is no training dataset. The second preset option has the advantage that quantization can be performed in a reasonable amount of time, and typically completes within a few hours. The accuracy of the user-provided ANN model on the user-selected NPU of the plurality of NPUs 220 tend to be better than the one obtained using the first preset option. The second preset option comprising a second quantization option may be provided to a user under the service name "DXNN pro." The second quantization option may involve a retraining step of the ANN model because it performs a layer-by-layer retraining of the ANN model.

The third preset option performs a quantization algorithm to convert 32-bit data representing a floating point of the ANN model to 8-bit data representing an integer, and then perform a quantization aware training (QAT) algorithm. In other words, the third preset option may further perform a quantization aware retraining algorithm using the ANN model that performed the first preset option as an input model. Thus, the third preset option may be a combination of the quantization algorithm and an algorithm from one of the various retraining options provided by the optimization module 211. In the third preset option, the quantization-aware retraining algorithm performs fine-tuning by quantizing the trained ANN model and then retraining it in a way that reduces the degradation of inference accuracy due to quantization. However, in order to retrain in a way that reduces the degradation of inference accuracy due to quantization, the user may provide the training dataset of the neural network model.

Furthermore, an evaluation dataset may be used to suppress overfitting during retraining. Specifically, the quantization-aware retraining algorithm inputs the machine code and the training dataset of the quantized ANN model into a corresponding NPU to retrain it and compensate for the degradation of inference accuracy due to quantization errors.

The third preset option has the advantage of ensuring relatively higher inference accuracy than the first and second preset options, but typically takes a few days to complete and is suitable when the accuracy has a higher priority. The third preset option comprising a third quantization option may be provided to users under the service name "DXNN master." The third quantization option may involve a retraining step of the ANN model because the retraining algorithm is performed based on the inference accuracy of the ANN model. For the quantization-aware retraining algorithm of the third quantization option, a training dataset and/or an evaluation dataset of the ANN model may be received from the user in the process of retraining in a direction that reduces the loss due to quantization. The training dataset is the used for quantization-aware retraining. The evaluation dataset is optional data that can be used to improve the overfitting problem during retraining.

Figure 5B:
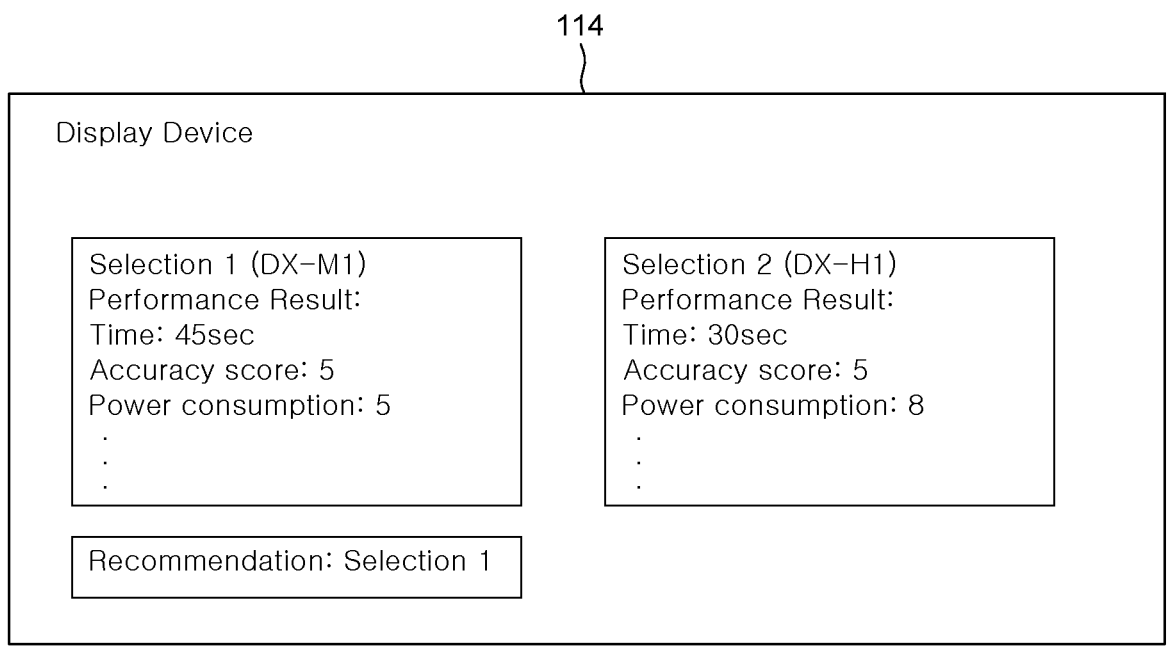
FIG. 5B is a user interface diagram for displaying a performance report and recommendation on the one or more neural processing units, according to an example of the present disclosure.

FIG. 5B is a user interface diagram for displaying a performance report and recommendation on selection of the one or more neural processing units, according to an example of the present disclosure. In the example of FIG. 5B, the results of performing the simulation/evaluation using two different types of NPUs are displayed. The upper left box shows the result of using DX-M1 NPU whereas the upper fight box shows the result of using DX-H1 NPU. The bottom box show the recommended selection of NPU based on the performance parameters of the two different NPUs.

Figure 6A:
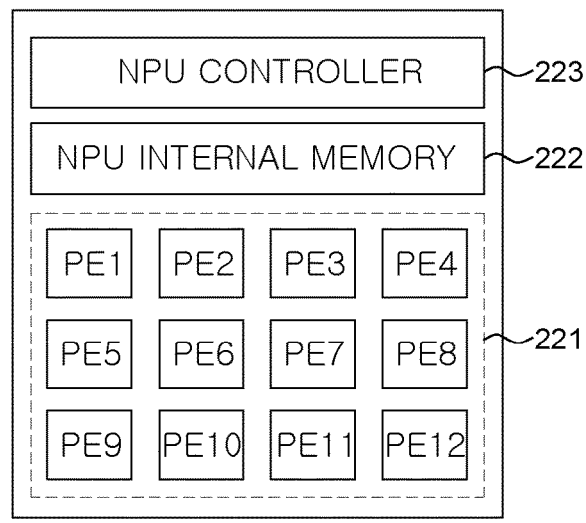
FIGS. 6A through 6D are block diagrams illustrating various configurations of neural processing units of an artificial neural network model processing apparatus, according to an example of the present disclosure.
Figure 6B:
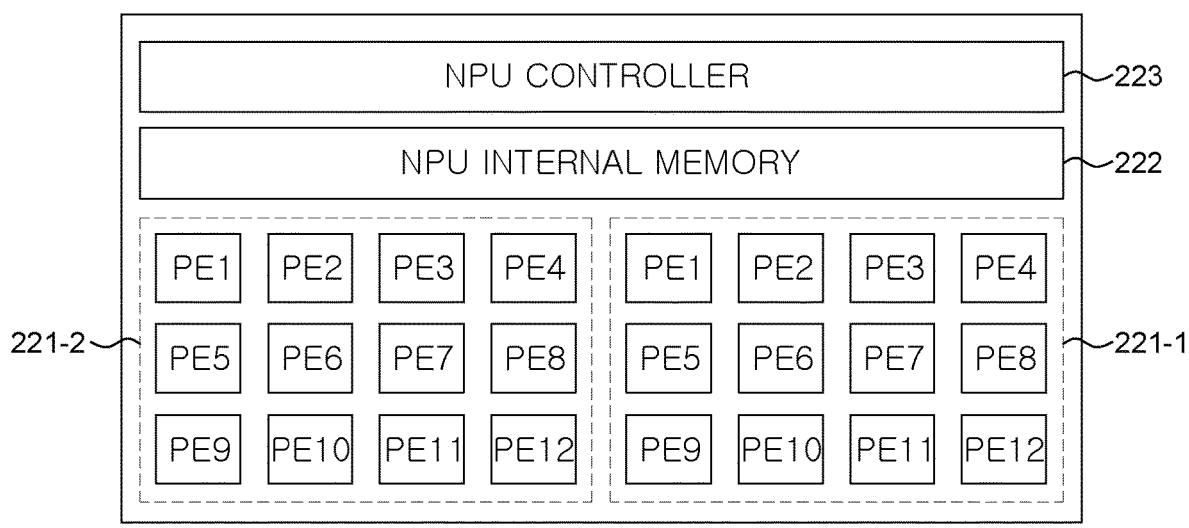
Figure 6C:
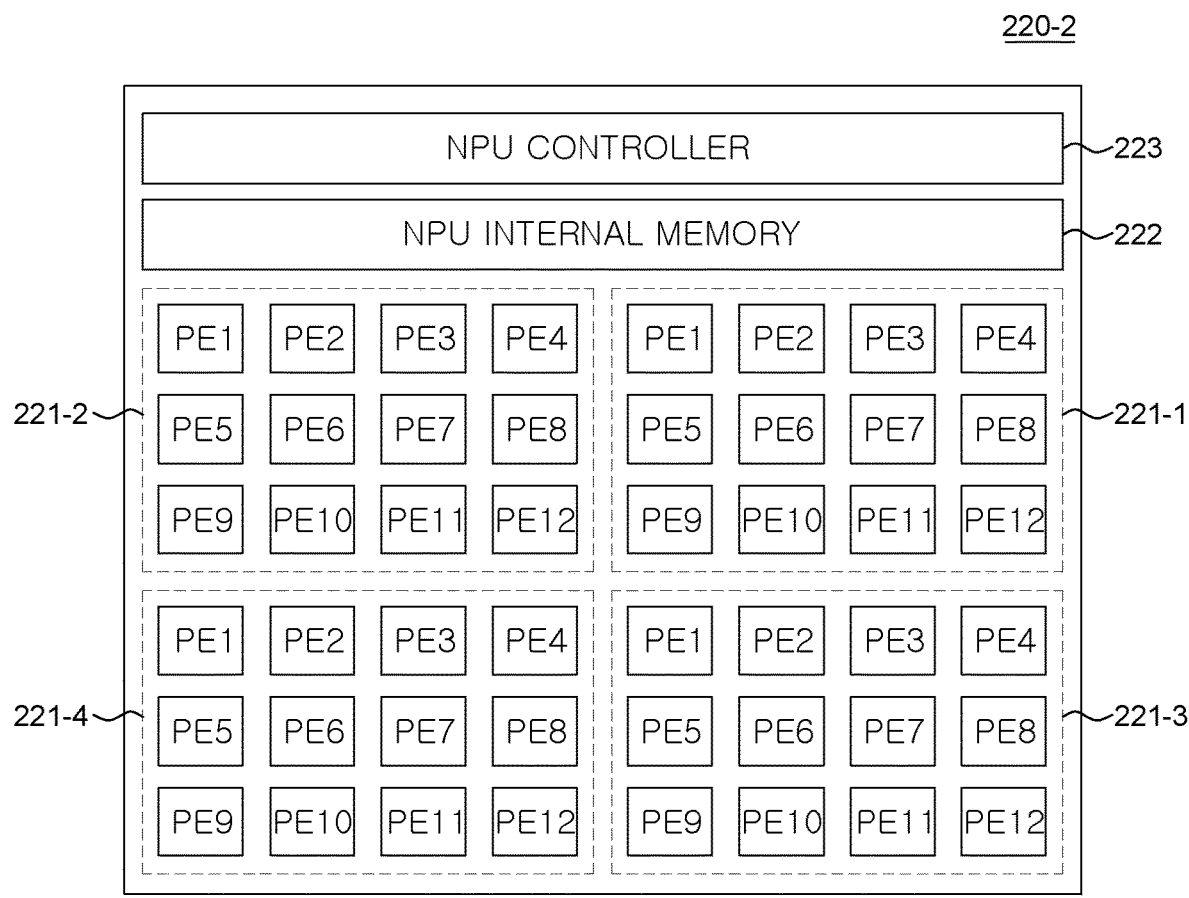

FIGS. 6A through 6C are block diagrams illustrating configurations of various NPUs in NPU farm 218, according to an example of the present disclosure. Specifically, FIG. 6A illustrates an internal configuration of a first NPU 220, FIG. 6B illustrates an internal configuration of a second NPU 220-1, and FIG. 6C illustrates an internal configuration of a third NPU 220-2.

The first NPU 220 of FIG. 6A includes a processing element array 221 (also referred to as "processor core array 221"), an NPU internal memory 222, and an NPU controller 223. The first NPU 220 may include the processing element array 221, an NPU internal memory 222, and an NPU controller 223 that controls the processing element array 221 and the NPU internal memory 222.

The NPU internal memory 222 may store, among other information, parameters for instantiating part of an ANN model or an entire ANN model on the processing element array 221, intermediate outputs generated by each of the processing elements, and at least a subset of data of the ANN model. The ANN model with various optimization options applied may be compiled into machine code or instructions for execution by various components of the first NPU 220 in a coordinated manner.

The NPU controller 223 controls operations of the processing element array 221 for inference operations of the first NPU 220 as well as read and write sequences of the NPU internal memory 222. The NPU controller 223 may also configure the processing elements and the NPU internal memory according to programmed modes if these components support multiple modes. The NPU controller 223 also allocates tasks processing elements in the processing element array 221, instructs the processing elements to read data from the NPU internal memory 222 or write data to the NPU internal memory, and also coordinates receiving data from storage module 240 or writing data to the storage module 240 according to the machine code or instructions generated as the result of compilation. Thus, the NPU can sequentially process operations for each layer according to the structure of the ANN model. The NPU controller 223 may obtain a memory address where the feature map and weights of the ANN model are stored or determine a memory address to be stored.

Processing element array 221 includes plurality of processing elements (or cores) PE1 to PE12 arranged in the form of an array. Each processing element may include multiply and accumulate (MAC) circuits and/or an arithmetic logic unit (ALU) circuits. However, other circuits may be included in addition or in lieu of MAC circuits and ALU circuits in the processing element. For example, a processing element may have a plurality of circuits implemented as multiplier circuits and/or adder tree circuits operating in parallel, replacing the MAC circuits within a single processing element. In such cases, the processing element array 221 may be referred to as at least one processing element comprising a plurality of circuits.

The processing element array 221 includes a plurality of processing elements PE1 to PE12. The plurality of processing elements PE1 to PE12 shown in FIG. 6A are for the purpose of illustration, and the number of the plurality of processing elements PE1 to PE12 is not limited to the example in FIG. 6A. The number of the plurality of processing elements PE1 to PE12 may determine the size or number of processing elements array 221. The processing element array 221 may be in the form of an N×M matrix, where N and M are integers greater than zero.

The arrangement and the number of the processing element array 221 can be designed to take into account the characteristics of the ANN model. In particular, the number of processing elements may be determined by considering the data size of the ANN model to be operated, the required inference speed, the required power consumption, and the like. The data size of the ANN model may correspond to the number of layers of the ANN model and the weight parameter size of each layer. As the number of processing elements in the processing element array 221 increases, the parallel computational capability of the operating ANN model also increases, but the manufacturing cost and physical size may increase as well. For example, as shown in FIG. 6B, the second NPU 220-1 may include two processing element arrays 221-1 and 221-2. Two processing element arrays 221-1 and 221-2 may be grouped and each array may include a plurality of processing elements PE1 to PE12.

In another example, as shown in FIG. 6C, the third NPU 220-2 may include four processing element arrays 221-1, 221-2, 221-3, and 221-4. Four processing element arrays 221-1, 221-2, 221-3, and 221-4 may be grouped and each array may include a plurality of processing elements PE1 to PE12.

Figure 6D:
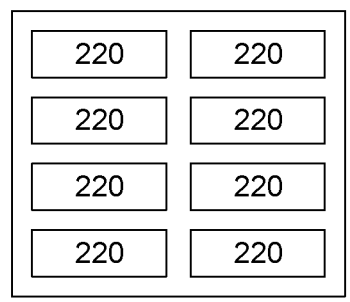

In another example, as shown in FIG. 6D, the fourth NPU 220-8 may include eight smaller first NPUs 220 as shown in FIG. 6A. Each of the eight first NPUs 220 is assigned to process part of the operations of the ANN model to further improve the speed of the ANN model. Further, some of the first NPUs 220 may be inactivated during operations to save the power consumption of the fourth NPU 220-8. For these purposes, the fourth NPU 220-8 may further include a higher level NPU controller (not shown) in addition to NPU controllers 223 in each of the first NPUs 220 to allocate the operations of the each of eight neural processing units and coordinate their operations.

Characteristics and processing models of the first to fourth neural processing units are described above.

Figure 7:
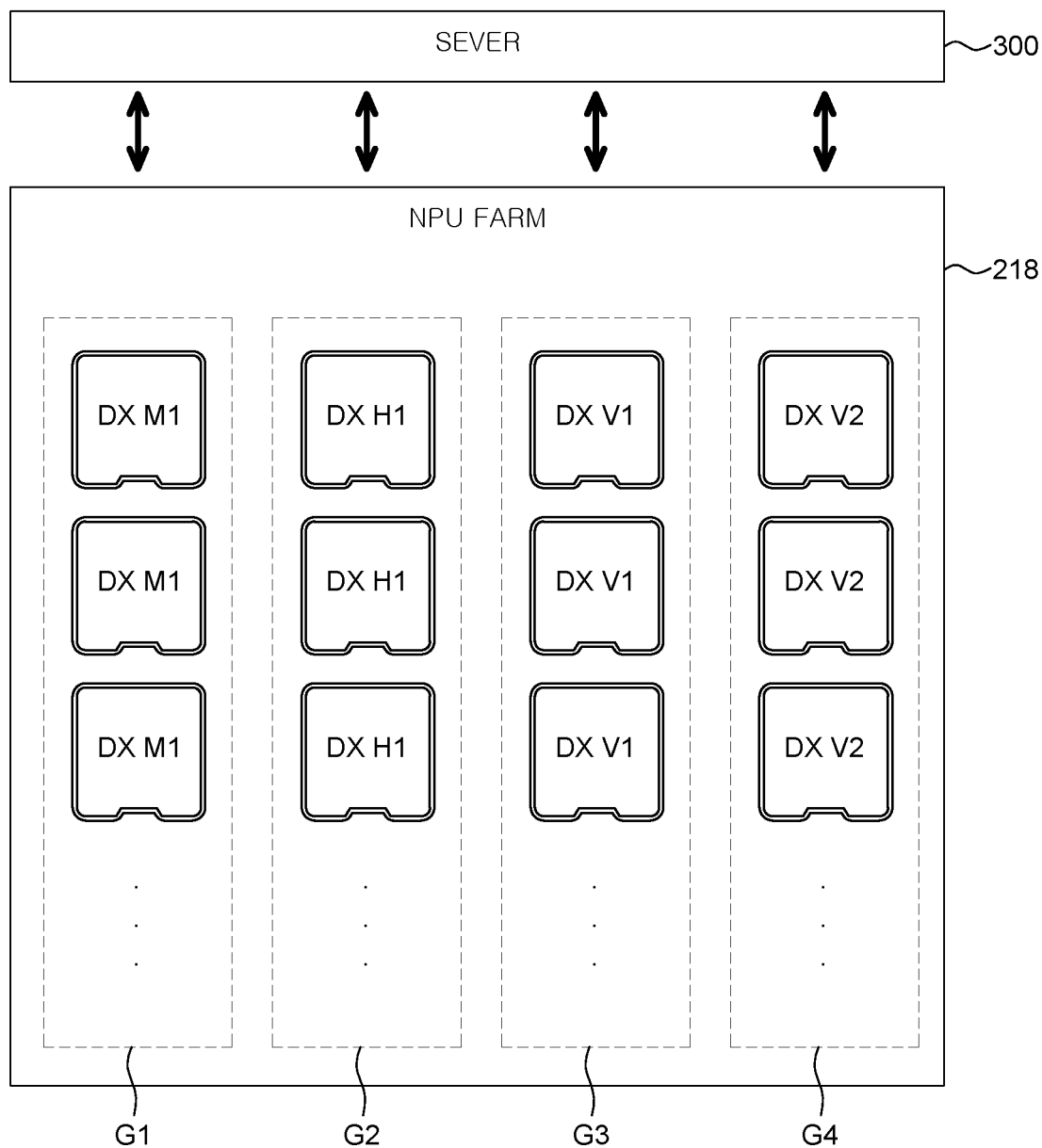
FIG. 7 is a block diagram illustrating a plurality of neural processing units, according to an example of the present disclosure.

FIG. 7 is a block diagram illustrating the configuration of a plurality of NPUs in the NPU farm 218, according to an example of the present disclosure. The plurality of NPUs 220 may include different types of NPUs. At least one NPU of the same type may also be included in the NPU farm 218. For example, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. The NPU farm 218 may be a cloud-based NPU system configured to respond in real time to performance evaluation requests from a plurality of users received via online communications. The plurality of NPUs 220 included in the first to fourth groups G1 to G4 may all be used for performance evaluation, or a subset of these NPUs 220 may be used for performance evaluation, depending on the user's choice.

Security-sensitive user data may be stored in the server 300, in the storage module 240 of the ANN model processing device 200 or both in the server 300 and in the storage module 240 of the ANN model processing device 200.

The at least one NPU 220 used for computation may communicate with the server 300 to receive the at least one particular ANN model for performance evaluation of the NPU and the at least one particular evaluation dataset that is fed to the ANN model. In other words, the NPU 220 may process the user data for performance evaluation.

Figure 8:
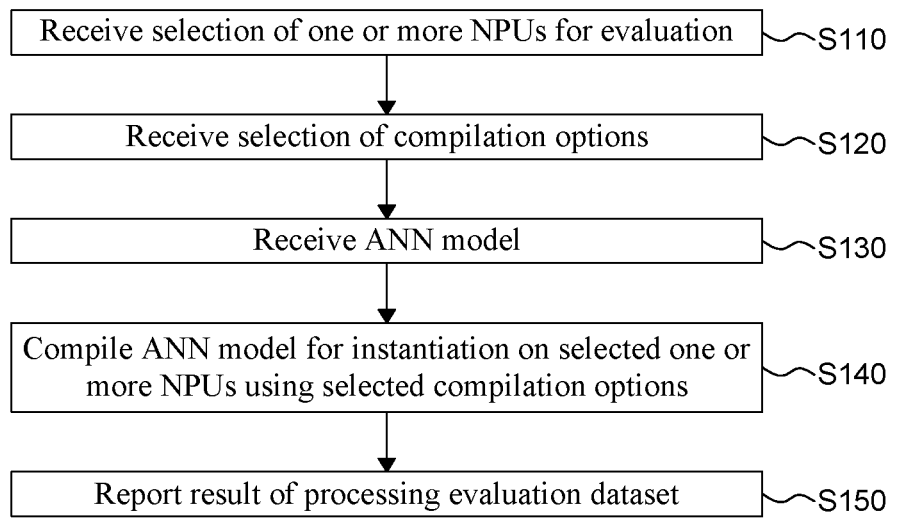
FIG. 8 is a flowchart illustrating a method of evaluating performance of an artificial neural network model instantiated on one or more neural processing units, according to an example of the present disclosure.

FIG. 8 is a flowchart illustrating a method of evaluating performance of an artificial neural network model instantiated on one or more NPUs, according to an example of the present disclosure. Referring to FIG. 8, an ANN model performance evaluation method S100 may include step S110 of receiving selection of one or more NPUs for evaluation, step S120 of receiving selection of compilation options, step S130 of receiving an ANN model at the server 300, step S140 of compiling the ANN model for instantiating on the one or more selected NPUs according to the compilation options, and step S150 of reporting result of the processing by the one or more selected NPUs.

In the NPU type selection step S110, a user may select a type of NPU for performance evaluation. The type of NPU may vary depending on the product line-up of NPUs sold by a particular company. In the example of FIG. 7, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. In this case, the user selects one or more NPUs for evaluation from "DX-M1" NPUs, "DX-H1" NPUs, "DX-V1" NPUs, and "DX-V2" NPUs. The user may select only a single type of NPU or NPUs for evaluation, or select a combination of different types of NPUs for evaluation.

Then, in the compilation option selection step S120, at least one of a plurality of compilation options for the ANN model to be processed is selected with respect to the selected at least one NPU. More specifically, in the compilation option selection step S120, a compilation option may be set based on hardware information of the NPU 220. Furthermore, in the compilation option selection step, a plurality of compilation options can be set based on the user's selection. In one or more embodiments, a description of the advantages and disadvantages of each compilation option can be displayed on the user device 100. Thus, the user may customize the various compilation options to suit the user's needs. In other words, the performance evaluation system 1000 may provide compilation options that are user-customized, rather than preset options, to meet the specific needs of the user. As described above, the compilation option may be at least one of a pruning algorithm, a quantization algorithm, a model compression algorithm, a knowledge distillation algorithm, a retraining algorithm, and an AI based model optimization algorithm. Alternatively, the compile option may be configured to select one of the predefined preset options.

Then, in the ANN model receiving step S130, at least one particular ANN model for evaluating the performance of the selected NPU is received at the server 300 from the user device 100. This may also be referred to as user data upload step.

Then, in the ANN model compilation step S140, the received ANN model is compiled according to the selected compilation options for instantiating on the one or more selected NPUs. Machine code or instructions are generated as the result of compilation, and are fed to the one or more NPUs to run the simulation.

In step S150 of reporting result, it is first determined whether the compiled ANN model is capable of being processed by the plurality of neural processing units 220. If the compiled ANN model cannot be processed by the plurality of neural processing units 220, the ANN model processing result reporting step S150 may report a layer of the plurality of layers of the ANN model that cannot be processed by the plurality of neural processing units 220. Then, the layer that cannot be processed by the plurality of neural processing units 220 may be processed by the GPU 230. If the compiled ANN model can be processed by the plurality of neural processing units 220, the ANN model processing result reporting step S150 may report the processing performance of the plurality of neural processing units 220.

The parameters of processing performance may be a temperature profile of the neural processing unit, power consumption (Watt), trillion operations per second per Watt (TOPS/W), frame per second (FPS), inference per second (IPS), accuracy, and the like.

If the user does not provide an evaluation data set, the ANN model performance evaluation system 1000 may analyze the size of the input data of the ANN model to generate corresponding dummy data, and may utilize the generated dummy data to perform performance evaluation. For example, the size of the dummy data may be (224×224×3), (288×288×3), (380×380×3), (515×512×3), (640×640×3), or the like, but is not limited to these sizes. In other words, even if a dataset for evaluating inference performance is not provided from a user, it may be possible to generate performance evaluation results such as power consumption, TOPS/W, FPS, IPS, and the like of a neural processing unit. However, in such cases, inference accuracy evaluation results may not be provided since the dummy data may not be accompanied by accurate inference answers.

According to an example of the present disclosure, a user can quickly determine whether a user's ANN model is operable on a particular NPU before purchasing the particular NPU.

According to an example of the present disclosure, a user can quickly determine, prior to purchasing a particular NPU, how a user's ANN model will perform when instantiated and executed on a particular NPU.

According to one example of the present disclosure, if each NPU is connected via a server for each type of NPU, the user can evaluate the user's ANN model online and receive a result for each NPU available for purchase. Thus, the performance evaluation system 1000 can provide the user with information on the performance and price of the neural processing unit required to implement the AI service developed by the user, which can help the user make a quick purchase decision.

Figure 9:
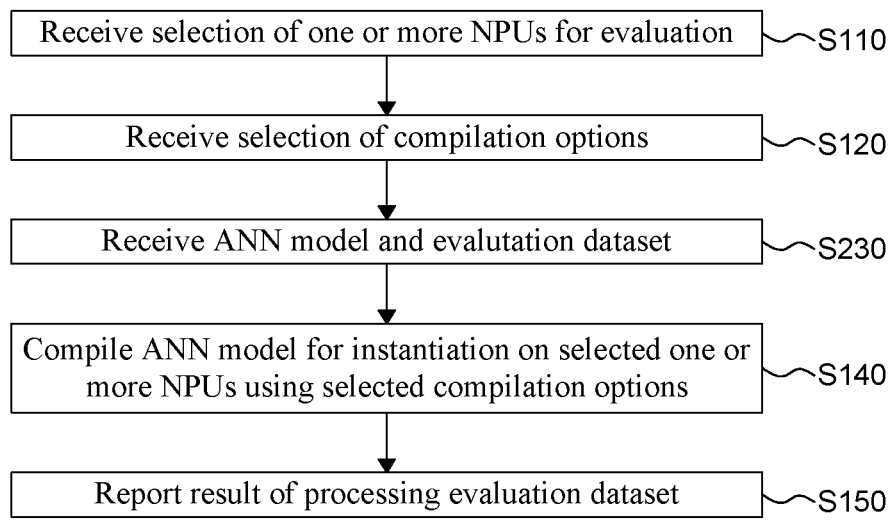
FIG. 9 is a flowchart illustrating a method of evaluating performance of, according to another example of the disclosure.

FIG. 9 is a flowchart illustrating evaluating performance of an ANN model instantiated on one or more NPUs, according to an example of the present disclosure. Referring to FIG. 9, an ANN model performance evaluation method S200 may include step S110 of receiving selection of one or more NPUs for evaluation, step S120 of receiving selection of compilation options, step S230 of receiving an ANN model and an evaluation dataset at the server 300, step S140 of compiling the ANN model for instantiating on the one or more selected NPUs according to the compilation options, and step S150 of reporting result of the processing the evaluation dataset using the one or more selected NPUs.

In the NPU type selection step S110, a user may select a type of NPU for performance evaluation. The type of NPU may vary depending on the product line-up of NPUs sold by a particular company. In the example of FIG. 7, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. In this case, the user selects one or more NPUs for evaluation from "DX-M1" NPUs, "DX-H1" NPUs, "DX-V1" NPUs, and "DX-V2" NPUs. The user may select only a single type of NPU or NPUs for evaluation, or select a combination of different types of NPUs for evaluation.

Then, in the compilation option selection step S120, at least one of a plurality of compilation options for the ANN model to be processed is selected with respect to the selected at least one NPU. More specifically, in the compilation option selection step S120, a compilation option may be set based on hardware information of the NPU 220. Furthermore, in the compilation option selection step, a plurality of compilation options can be set based on the user's selection. In one or more embodiments, a description of the advantages and disadvantages of each compilation option can be displayed on the user device 100. Thus, the user may customize the various compilation options to suit the user's needs. In other words, the performance evaluation system 1000 may provide compilation options that are user-customized, rather than preset options, to meet the specific needs of the user. As described above, the compilation option may be at least one of a pruning algorithm, a quantization algorithm, a model compression algorithm, a knowledge distillation algorithm, a retraining algorithm, and an AI based model optimization algorithm. Alternatively, the compile option may be configured to select one of the predefined preset options.

Then, in step S230, at least one particular ANN model for evaluating the performance of the selected NPU and at least one particular evaluation dataset are received at server 300 from the user device 100. This may also be referred to as user data upload step. The particular evaluation dataset described refers to an evaluation dataset that is fed to the at least on particular ANN model instantiated by the ANN model processing device 200 for performance evaluation of the ANN model processing device 200.

Then, in the ANN model compilation step S140, the received ANN model is compiled according to the selected compilation options for instantiating on the one or more selected NPUs. Machine code or instructions are generated as the result of compilation, and are fed to the one or more NPUs to run the simulation.

In the ANN model processing result reporting step S150, the performance evaluation result of the neural processing unit that processed the compiled ANN model can be reported. The performance evaluation result report may be stored in the user's account or sent to the user's email address. However, the performance evaluation result can be provided to users in a variety of other ways. A performance evaluation result is also treated as user data and may be subject to the security policies that apply to the user data.

In the ANN model processing result reporting step S150, it is first determined whether the compiled ANN model may be processed by the plurality of neural processing units 220. If the compiled ANN model cannot be processed by the plurality of neural processing units 220, the ANN model processing result reporting step S150 may report a layer of the plurality of layers of the ANN model that cannot be processed by the plurality of neural processing units 220. Then, the layer that cannot be processed by the plurality of neural processing units 220 may be processed by the GPU 230. If the compiled ANN model can be processed by the plurality of neural processing units 220, the ANN model processing result reporting step S150 may report the processing performance of the plurality of neural processing units 220.

The parameters of processing performance may be a temperature profile of the neural processing unit, power consumption (Watt), trillion operations per second per Watt (TOPS/W), frame per second (FPS), inference per second (IPS), accuracy, and the like.

According to an example of the present disclosure, a user can quickly determine, prior to purchasing a particular NPU, how a user's ANN model will perform when instantiated and executed on a particular NPU.

According to one example of the present disclosure, if each NPU is connected via a server for each type of NPU, the user can evaluate the user's ANN model online and receive a result for each NPU available for purchase. Thus, the performance evaluation system 1000 can provide the user with information on the performance and price of the neural processing unit required to implement the AI service developed by the user, which can help the user make a quick purchase decision.

Figure 10:
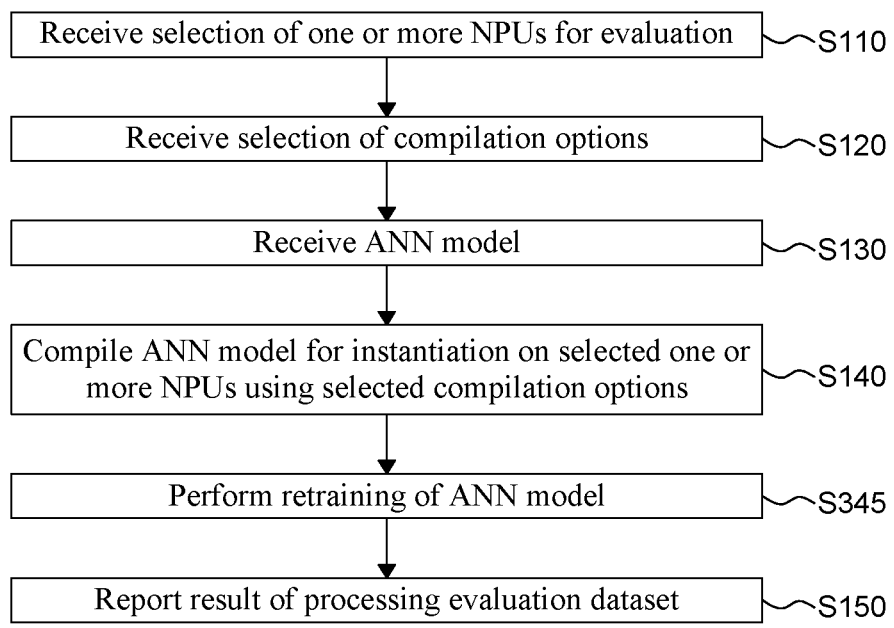
FIG. 10 is a flowchart illustrating a method of evaluating performance of, according to another example of the disclosure.

Referring to FIG. 10, a method for evaluating the performance of an ANN model according to another example of the present disclosure with a retraining step will be described. FIG. 10 is a flowchart illustrating evaluating performance of an ANN model instantiated on one or more NPUs, according to an example of the present disclosure. Referring to FIG. 10, an ANN model performance evaluation method S300 may include step S110 of receiving selection of one or more NPUs for evaluation, step S120 of receiving selection of compilation options, step S230 of receiving an ANN model and an evaluation dataset at the server 300, step S140 of compiling the ANN model for instantiating on the one or more selected NPUs according to the compilation options, step S345 of performing retraining on the ANN model, and step S150 of reporting result of the processing the evaluation dataset using the one or more selected NPUs.

In the NPU type selection step S110, a user may select a type of NPU for performance evaluation. The type of NPU may vary depending on the product line-up of NPUs sold by a particular company. In the example of FIG. 7, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. In this case, the user selects one or more NPUs for evaluation from "DX-M1" NPUs, "DX-H1" NPUs, "DX-V1" NPUs, and "DX-V2" NPUs. The user may select only a single type of NPU or NPUs for evaluation, or select a combination of different types of NPUs for evaluation.

Then, in the compilation option selection step S120, at least one of a plurality of compilation options for the ANN model to be processed is selected with respect to the selected at least one NPU. More specifically, in the compilation option selection step S120, a compilation option may be set based on hardware information of the NPU 220. Furthermore, in the compilation option selection step, a plurality of compilation options can be set based on the user's selection. In one or more embodiments, a description of the advantages and disadvantages of each compilation option can be displayed on the user device 100. Thus, the user may customize the various compilation options to suit the user's needs. In other words, the performance evaluation system 1000 may provide compilation options that are user-customized, rather than preset options, to meet the specific needs of the user. As described above, the compilation option may be at least one of a pruning algorithm, a quantization algorithm, a model compression algorithm, a knowledge distillation algorithm, a retraining algorithm, and an AI based model optimization algorithm. Alternatively, the compile option may be configured to select one of the predefined preset options.

Then, in step S230, at least one particular ANN model for evaluating the performance of the selected NPU and at least one particular evaluation dataset are received at server 300 from the user device 100. This may also be referred to as user data upload step. The particular evaluation dataset described refers to an evaluation dataset that is fed to the at least on particular ANN model instantiated by the ANN model processing device 200 for performance evaluation of the ANN model processing device 200.

Then, in the ANN model compilation and processing step S140, the input ANN model is compiled according to the selected compilation option, and the compiled machine code and the evaluation dataset are input to the selected neural processing unit within the NPU farm for processing.

If a retraining option is selected in the compilation option, retraining of the ANN model may be performed in retraining step S345. During the retraining, the performance evaluation system 1000 may assign the GPU 230 to perform retraining on the ANN model processing device 200. For example, in the retraining step S345 of the ANN model, the GPU 230 may receive an ANN model applied with the pruning algorithm and/or the quantization algorithm and a training dataset as input to perform retraining. The retraining may be performed on an epoch-by-epoch basis, and several to hundreds of epochs may be performed on the GPU 230. The retraining option may include a quantization aware retraining option, a pruning aware retraining option, and a transfer learning option.

In the ANN model processing result reporting step S150, the performance evaluation result of the neural processing unit that processed the compiled ANN model can be reported. The performance evaluation result report may be stored in the user's account or sent to the user's email address. However, the performance evaluation result can be provided to users in a variety of ways, including but not limited to what is illustrated in FIG. 5B. A performance evaluation result is also treated as user data and may be subject to the security policies that apply to the user data.

In the ANN model processing result reporting step S150, it is first determined whether the compiled ANN model is capable of being processed by the plurality of neural processing units 220. If the compiled ANN model cannot be processed by the plurality of neural processing units 220, the ANN model processing result reporting step S150 may report a layer of the plurality of layers of the ANN model that cannot be processed by the plurality of neural processing units 220. Then, the layer that cannot be processed by the plurality of neural processing units 220 may be processed by the GPU 230. If the compiled ANN model can be processed by the plurality of neural processing units 220, the ANN model processing result reporting step S150 may report the processing performance of the plurality of neural processing units 220.

The parameters of processing performance may be a temperature profile of the neural processing unit, power consumption (Watt), trillion operations per second per Watt (TOPS/W), frame per second (FPS), inference per second (IPS), accuracy, and the like.

According to another example of the present disclosure, a user can quickly determine whether a user's ANN model is operable on a particular NPU before purchasing the particular NPU.

According to another example of the present disclosure, a user can quickly determine, prior to purchasing a particular NPU, how a user's ANN model will perform when running on a particular NPU.

According to another example of the present disclosure, if each NPU is connected via a server for each type of NPU, the user can evaluate the user's ANN model online and receive a result for each NPU available for purchase.

According to another example of the present disclosure, an ANN model retraining algorithm optimized for a particular neural processing unit can be performed online via the performance evaluation system 1000. In this case, user data can be separated and protected from the operator of the performance evaluation system 1000 by the security policies described above.

Thus, the performance evaluation system 1000 can provide the user with information on the performance and price of the neural processing unit required to implement the AI service developed by the user, which can help the user make a quick purchase decision.

The present disclosure has been described in more detail with reference to the accompanying drawings, but the present disclosure is not necessarily limited to these examples and may be practiced in various modifications. Accordingly, the examples disclosed herein are intended to illustrate and not to limit the technical concepts of the present disclosure, and the scope of the technical concepts of the present disclosure is not limited by these examples. Therefore, the examples described above should be understood to be exemplary and non-limiting in all respects. The scope of protection of the present disclosure shall be construed in accordance with the following claims, and all technical ideas within the same scope shall be construed to be included in the scope of the present disclosure.

National Research and Development Project that Supported this Invention

[Assignment number] 1711195792
[Assignment number] 00228938
[Ministry Name] Ministry of Science and ICT
[Name of project management (professional) organization] Korea Information and Communication Planning and Evaluation Institute
[Research project name] Artificial intelligence semiconductor SW integrated platform technology development
[Research project name] Commercial edge AI SoC semiconductor SW development platform technology development
[Contribution rate] 1/1
[Name of project carrying out organization] DeepX
[Research period] 2023.04.01~2023.12.31

What is claimed is:

1. An artificial neural network (ANN) system, comprising:
   a plurality of neural processors comprising a first neural processor of a first physical configuration and a second neural processor of a second physical configuration different from the first physical configuration;
   one or more operating processors; and
   memory storing instructions thereon, the instructions when executed by the one or more operating processors cause the one or more operating processors to:
      receive an ANN model;
      receive selection of a first subset of the plurality of neural processors for instantiating at least one layer of the ANN model, the first subset of the neural processors including at least one of the first neural processor or the second neural processor for instantiating the ANN model;
      receive compilation options,
      instantiate at least one layer of the ANN model on the first subset of the plurality of neural processors by compiling the ANN model according to the compilation options,
      perform processing on one or more evaluation datasets by the first subset of the plurality of neural processors instantiating the at least one layer of the ANN model, and
      generate one or more first performance parameters associated with processing of the one or more evaluation datasets by the first subset of the plurality of neural processors instantiating at least one layer of the ANN model.

2. The ANN system of claim 1, further comprising a computing device, the computing device comprising:
   one or more processors, and
   memory storing instruction thereon, the instructions causing the one or more processors to:
      receive the selection of the first subset of the plurality of neural processors, the one or more evaluation datasets, and the compilation options from a user device via a network,
      send the selection of the first subset of the plurality of neural processors, the one or more evaluation datasets, and the compilation options to the one or more operating processors,
      receive the one or more first performance parameters from the one or more operating processors, and
      send the received one or more first performance parameters to the user device via the network.

3. The ANN system of claim 2, wherein the instructions cause the one or more processors to protect the one or more evaluation datasets by at least one of data encryption, differential privacy, and data masking.

4. The ANN system of claim 1, wherein the compilation options comprise selection on using at least one of a quantization algorithm, a pruning algorithm, a retraining algorithm, a model compression algorithm, an artificial intelligence (AI) based model optimization algorithm, or a knowledge distillation algorithm to improve performance of the ANN model.

5. The ANN system of claim 1, wherein at least the first neural processor comprises internal memory and a multiply-accumulator, and wherein the instructions further cause the one or more operating processors to automatically set the at least one of the compilation options based on the first physical configuration.

6. The ANN system of claim 1, wherein the instructions further cause the one or more processors to:
   determine whether at least another of layers in the ANN model is operable using the first subset of the plurality of neural processors.

7. The ANN system of claim 6, wherein the instructions further cause the one or more processors to:
   generate an error report responsive to determining that at least the other of the layers in the ANN model is inoperable using the first subset of the plurality of neural processors.

8. The ANN system of claim 6, further comprising a graphics processor configured to process the at least other of the layers in the ANN model that is determined to be inoperable using the first subset of the plurality of neural processors.

9. The ANN system of claim 8, wherein the graphics processor is further configured to perform retraining of the ANN model for instantiation on the first subset of the plurality of neural processors.

10. The ANN system of claim 1, wherein the one or more first performance parameters comprise at least one of: temperature profile, power consumption, a number of operations per second per watt, frame per second (FPS), inference per second (IPS), and accuracy of inference or prediction, of the first subset of the plurality of neural processors.

11. The ANN system of claim 1, wherein instructions further cause the one or more operating processors to:
receive selection of a second subset of the plurality of neural processors including at least one of the first neural processor or the second neural processor for instantiating the ANN model,
instantiate the at least one layer of the ANN model on the second subset of the plurality of neural processors by compiling the ANN model;
perform processing on the one or more evaluation datasets by the second subset of the plurality of neural processors instantiating the at least one layer of the ANN model, and
generate one or more second performance parameters associated with processing of the one or more evaluation datasets by the second subset of the plurality of neural processors instantiating the at least one layer of the ANN model.

12. The ANN system of claim 11, wherein instructions further cause the one or more operating processors to:
generate recommendation on the first subset of the plurality of selection of neural processors or the second subset of the plurality of neural processors by comparing the one or more first performance parameters and the one or more second performance parameters, and
send the recommendation to a user terminal.

13. The ANN system of claim 1, wherein the received compilation options represent one of a plurality of preset options representing combinations of applying of (i) a post training quantization (PTQ), (ii) a layer-wise retraining of the ANN model, and (iii) a quantization aware retraining (QAT).

14. A method comprising:
receiving, by one or more operating processors, an artificial neural network (ANN) model;
receiving selection of a first subset of a plurality of neural processors including at least one of a first neural processor or a second neural processor for instantiating the ANN model, the first neural network processor of a first physical configuration and the second neural processor of a second physical configuration different from the first physical configuration;
receiving compilation options;
instantiating at least one layer of the ANN model on the first subset of the plurality of neural processors by compiling the ANN model according to the compilation options;
performing processing on one or more evaluation datasets by the first neural processors instantiating the at least one layer of the ANN model;
generating one or more first performance parameters associated with processing of the one or more evaluation datasets by the first subset of the plurality of neural processors instantiating at least one layer of the ANN model; and
sending the generated one or more first performance parameters via the network.

15. The method of claim 14, further comprising:
receiving, by a computing device, the selection of the first subset of the plurality of neural processors, the one or more evaluation datasets, and the compilation options from a user device;
sending the selection of the first subset of the plurality of neural processors, the one or more evaluation datasets, and the compilation options to the one or more operating processors;
receiving the one or more first performance parameters sent from the one or more operating processors, and
sending the received one or more first performance parameters to the user device via the network.

16. The method of claim 15, further comprising:
performing at least one of data encryption, differential privacy, and data masking on the one or more evaluation datasets by the computing device.

17. The method of claim 14, wherein the compilation options comprise selection on using at least one of a quantization algorithm, a pruning algorithm, a retraining algorithm, a model compression algorithm, an artificial intelligence (AI) based model optimization algorithm, or a knowledge distillation algorithm to improve performance of the ANN model.

18. The method of claim 14, further comprising automatically setting the at least one of the compilation options based on the first physical configuration or the second physical configuration.

19. The method of claim 14, further comprising:
generating an error report responsive to determining that at least another of the layers in the ANN model is inoperable using the first subset of the plurality of neural processors.

20. The method of claim 14, further comprising processing at least another of the layers in the ANN model by a graphics processor responsive to the other of the layers determined to be inoperable using the first subset of the plurality of neural processors.

21. The method of claim 14, further comprising:
performing, by a graphics processor, retraining of the ANN model for instantiation on the first subset of the plurality of neural processors.

22. The method of claim 14, wherein the one or more first performance parameters comprise at least one of: temperature profile, power consumption, a number of operations per second per watt, frame per second (FPS), inference per second (IPS), and accuracy of inference or prediction, of the first subset of the plurality of neural processors.

23. The method of claim 14, further comprising receiving, by the one or more operating processors, selection of a second subset of the plurality of processors including at least one of the first neural processor or the second neural processor for instantiating the ANN model,
instantiating the at least one layer of the ANN model on the second subset of the plurality of neural processors by compiling the ANN model;
performing processing on the one or more evaluation datasets by the second subset of the plurality of neural processors instantiating the at least one layer of the ANN model, and
generating one or more second performance parameters associated with processing of the one or more evaluation datasets by the second subset of the plurality of neural processors instantiating the at least one layer of the ANN model.

24. The method of claim 23, further comprising:
generating recommendation on the first subset of the plurality of neural processors or the second subset of the plurality of neural processors by comparing the one or more first performance parameters and the one or more second performance parameters, and
sending the recommendation to a user terminal.

25. The method of claim 14, wherein the compilation options represent one of a plurality of preset options representing combinations of applying of (i) a post training quantization (PTQ), (ii) a layer-wise retraining of the ANN model, and (iii) a quantization aware retraining (QAT).

26. A method comprising:
displaying options for selecting from a plurality of neural processors including a first neural processor of a first physical configuration and a second neural processor of a second physical configuration different from the first physical configuration;
receiving selection of a first subset of the plurality of neural processors for instantiating at least one layer of an artificial neural network (ANN) model from a user;
displaying compilation options associated with compilation of the ANN model for instantiation the at least one layer;
receiving first selection of the compilation options from the user;
sending the selection of the first subset of the plurality of neural processors, the selected compilation options, and one or more evaluation datasets to a computing device coupled to the plurality of neural processors;
receiving one or more first performance parameters associated with processing of the one or more evaluation datasets by the first subset of the plurality of neural processors instantiating at least one layer of the ANN model using the first selected compilation options; and
displaying the one or more first performance parameters.

27. The method of claim 26, further comprising:
receiving selection of a second subset of the plurality of neural processors from the user;
receiving second selection of the compilation options from the user;
sending the second subset of the plurality of neural processors and the selected compilation options to the computing device coupled to the plurality of neural processors; and
receiving one or more second performance parameters associated with processing of the one or more evaluation datasets by the second subset of the plurality of neural processors instantiating at least one layer of the ANN model using the second selected compilation options.

28. The method of claim 27, further comprising:
receiving recommendation on use of the first subset of the plurality of neural processors or the second subset of the plurality of neural processors; and
displaying the recommendation.

* * * * *